Figure 1:
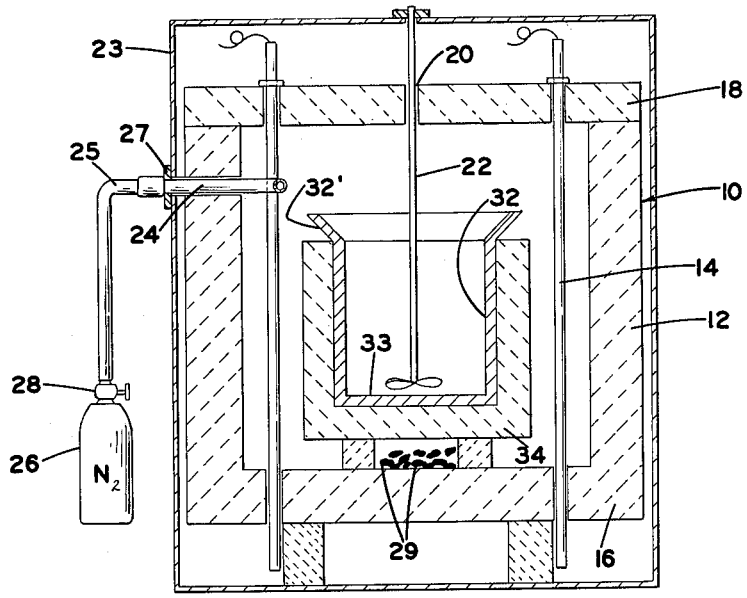

Feb. 8, 1966    R. A. WEIDEL    3,233,993
APPARATUS FOR PROCESSING A VITREOUS COMPOSITION
Filed March 6, 1962

*INVENTOR.*
ROBERT A. WEIDEL
BY
ATTORNEYS.

3,233,993
APPARATUS FOR PROCESSING A VITREOUS COMPOSITION
Robert A. Weidel, Webster, N.Y., assignor to Bausch & Lomb Incorporated, Rochester, N.Y., a corporation of New York
Filed Mar. 6, 1962, Ser. No. 177,773
5 Claims. (Cl. 65—374)

This invention relates to a method and apparatus for processing a vitreous composition, and more particularly to a method and apparatus for subjecting a vitreous composition to a reducing atmosphere.

Recent investigations in the field of glass technology relating to compositions having high concentrations of $Ce+^3$ ions or various other ions in their lower valence state have led to a study on the effects of reducing agents on various glass compositions.

Experiments with glass compositions melted in a carbon monoxide atmosphere indicate that optical properties are altered by melting a composition in a reducing atmosphere. For example, the ultraviolet absorption has been reduced and the luminescence characteristics of various compositions have been improved by such treatment. It is theorized, though not proven, that a reducing atmosphere will reduce formation of peroxide or superoxide ions, to thereby allow a more precise construction of glass networks. Obtaining more precise networks should result in obtaining particular optical and physical properties.

The present results warrant additional investigations in order to fully exploit further advantages associated with melting vitreous or glass compositions in a reducing atmosphere. Also the advantageous results obtained in the ultraviolet absorption and luminescence characteristics warrant commercial processing of glasses in a reducing atmosphere. Such investigations and commercial exploitation have been limited, however, due to the adverse effect of a reducing atmosphere on a platinum vessel. Platinum vessels are desired for processing optical glasses since impurities from a refractory pot are from a practical standpoint often intolerable or at least undesirable. Similarly, ultraviolet transmitting elements and various other glass compositions having critical optical requirements necessitate the use of a platinum vessel and prevent the use of a refractory pot.

One approach to the present problem is to use a relatively small platinum lined vessel surrounded with graphite. Several small batches of glass may be melted in a reducing atmosphere before the degradation of the platinum reaches an intolerable state. Attempts to melt glass in a reducing atmosphere on a large scale resulted in massive deterioration of the platinum stirrer and a substantial portion of a platinum pot. A large amount of platinum appeared to crystalize and was unsatisfactory for continued use.

Before additional investigations into the effects of a reducing atmosphere on vitreous compositions and more particularly on optical glasses could be continued a suitable container was needed. Advantageously, the present invention provides a method of and apparatus for subjecting a vitreous composition to a reducing atmosphere which overcomes the aforementioned problem. The novel method and apparatus is effective not only for small laboratory batches but may be incorporated in a manner which allows for full manufacturing utilization of reducing atmospheres.

Briefly, the apparatus according to the present invention comprises a container for processing glass. The container includes a metallic inner surface which consists essentially of iridium. Preferably the container includes an inner iridium surface wherein the iridium is in a relatively pure state. An alloy containing approximately fifty percent iridium and fifty percent rhodium has been considered, however, was shown to be inferior to a relatively pure iridium container. Present indications are that platinum in excess of twenty percent would be undesirable. It is also desirable to fabricate a stirrer including an iridium portion for contacting a reducing atmosphere.

The invention also contemplates a novel combination comprising a furnace, means for introducing and maintaining a reducing atmosphere in the furnace and a container having a metal inner surface. The metal surface which is in contact with the atmosphere and/or the melt consists essentially of iridium. It is also desirable to fabricate a stirrer including an iridium portion for contacting the reducing atmosphere.

A method according to the present invention comprises the step of providing a metal lined vessel wherein the metal consists essentially of iridium. The vitreous composition is placed in the vessel with the vitreous composition contacting the metal surface. Thereafter the vitreous composition is subjected to the effect of heat and a reducing atmosphere.

Figure 2:
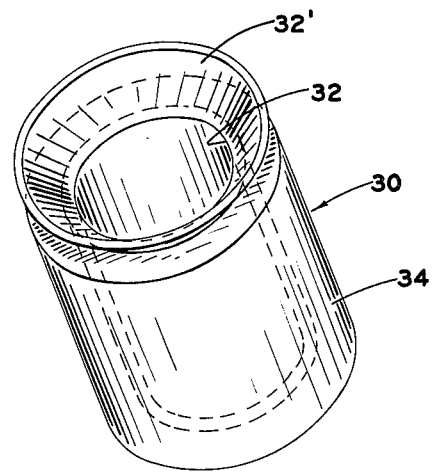

The invention will now be described in more detail in connection with the accompanying drawings, in which;

FIG. 1 is a cross sectional view illustrating apparatus according to the invention, which is suitable for carrying out the novel method according to the invention; and, FIG. 2 is a perspective view illustrating a container according to a preferred embodiment of the invention.

Referring now more particularly to the drawings, like reference numerals are used to indicate similar parts. A furnace 10 includes refractory walls 12 and heating elements 14. The furnace also includes a base 16 and a top 18. The top 18 includes an aperture 20. The aperture 20 allows a stirrer 22 consisting essentially of iridium to be inserted into the interior of the furnace 10. The portion of the stirrer 22 which contacts a reducing atmosphere should be iridium, however, other portions may be fabricated of conventional materials. The stirrer 22 may be connected to any means (not shown) for imparting rotational motion to the stirrer. A metal housing 23 including gasket means is included to prevent air from entering the chamber. An inlet 24 which also includes gasket means 27 extends through one of the refractory walls 12 for introducing a reducing atmosphere into the interior of the furnace.

The inlet 24 is connected through the intermediary of a pipe 25 to a source 26 of any inert gas. The source 26 may comprise a tank of nitrogen. A valve 28 is fixed to the source 26 and controls the flow of gas into the furnace, maintaining a slight positive pressure. Graphite chunks 29 are introduced into the furnace. The graphite oxidizes in an atmosphere containing a limited amount of oxygen. This produces a carbon monoxide, carbon dioxide, inert gas atmosphere. The carbon monoxide is the reducing atmosphere. The burning of the graphite takes place at about 2000° F. or above. It is to be understood, however, that carbon monoxide or any other suitable reducing atmosphere could be introduced directly at the inlet 24.

The container 30 includes a metallic lining 32. The metallic lining 32 is preferably made of relatively pure iridium. Tests indicate that alloys having a relatively high iridium content are satisfactory. Another material comprises an iridium rhodium alloy wherein the percentages of each are approximately equal. From a practical standpoint a 50–50 rhodium iridium alloy or a combination therebetween having less iridium are less desirable than a relatively pure iridium surface. It has also been found that an excess of platinum is intolerable.

Generally, the container comprises two portions. A refractory portion 34 surrounds the lining 32 or inner portion and extends under a base 33 of the lining 32. Any suitable high temperature refractory material, i.e. Alundum, sillimanite, mullite, etc. may be used as a support for reinforcing the iridium lining. The container has a shape generally similar to a right circular cylinder, the interior of which defines a cavity. The upper portion 32' of the iridium lining is flared outwardly to facilitate adding a batch or removing the melt.

Iridium is the preferred material. However, the difficulty in working iridium may make it desirable to incorporate other elements in order to facilitate manufacturing of a container according to the invention. Iridium is relatively difficult to work and, therefore, makes fabrication of an iridium container relatively difficult and expensive. The expense is more than compensated for, however, by the durability of the container. Also, the additional expense of fabrication is warranted by the advantageous results obtained by subjecting vitreous compositions to a reducing atmosphere during melting thereof.

The iridium containing lining of the container is an essential element in a novel combination which includes a furnace and means for providing a reducing atmosphere. Means including the furnace are also provided for maintaining the reducing atmosphere during the melting of the vitreous composition. In some cases it is even desirable to maintain a reducing atmosphere during partial cooling of the melt. It is also desirable to include an iridium stirrer or a stirrer having an iridium portion for contacting the reducing atmosphere.

In the practice of the invention any furnace suitable for melting glass may be adapted to be used according to the invention. Means such as an aperture 24 are provided to introduce a reducing atmosphere. For example, nitrogen and graphite may be introduced through the aperture into the furnace. The furnace should be capable of producing a temperature of over 2000° F.

A method according to the present invention comprises the step of providing a metal lined vessel consisting essentially of iridium, placing a vitreous composition into the vessel, and subjecting the vitreous composition to a reducing atmosphere and heat. The metal surface is in contact with the reducing atmosphere and/or the vitreous composition. Generally, the iridium lined vessel will be preheated prior to placing a vitreous composition therein. The vitreous composition will be added in portions and allowed to melt prior to the addition of more composition. A reducing atmosphere will be maintained in the proximity of the melt. The melt may be partially cooled in the reducing atmosphere. The vitreous composition is removed from the container either prior to or subsequent to partial cooling.

Generally, after providing an iridium container and stirrer, batches may be processed according to accepted optical glass melting techniques.

What is claimed is:

1. A container for processing a vitreous composition including an inner metallic surface consisting essentially of a major proportion of iridium and a minor proportion of rhodium.

2. A container for processing a vitreous composition including an inner metallic surface consisting essentially of 50 to 100 percent iridium, 0 to 50 percent rhodium and not more than 20 percent platinum.

3. A container for processing a vitreous composition including a relatively pure iridium inner surface for contacting a reducing atmosphere.

4. A container for processing a vitreous composition including means defining a cavity, a relatively pure iridium lining on the inner surface of said cavity defining means, and means for supporting said iridium lining on said surface.

5. A container for processing a vitreous composition according to claim 4, in which, the shape of the container is generally similar to a right circular cylinder.

References Cited by the Examiner
UNITED STATES PATENTS

| | | | |
|---|---|---|---|
| 2,106,527 | 1/1938 | Hostetter | 65—374 |
| 2,686,212 | 8/1954 | Horn et al. | 65—157 |
| 2,777,254 | 1/1957 | Siefert et al. | 65—374 |

DONALL H. SYLVESTER, *Primary Examiner.*